(12) United States Patent
Shpantzer et al.

(10) Patent No.: US 7,715,720 B2
(45) Date of Patent: May 11, 2010

(54) COHERENT OPTICAL DETECTOR AND COHERENT COMMUNICATION SYSTEM AND METHOD

(75) Inventors: Isaac Shpantzer, Bethesda, MD (US); Aviv Salamon, Ra'anana (IL); Pak Shing Cho, Gaithersburg, MD (US)

(73) Assignee: CeLight, Inc., Silver Spring, MD (US)

( * ) Notice: Subject to any disclaimer, the term of this patent is extended or adjusted under 35 U.S.C. 154(b) by 476 days.

(21) Appl. No.: 11/695,920

(22) Filed: Apr. 3, 2007

(65) Prior Publication Data

US 2007/0274733 A1 Nov. 29, 2007

Related U.S. Application Data

(63) Continuation of application No. 10/669,130, filed on Sep. 22, 2003, now Pat. No. 7,327,913, and a continuation-in-part of application No. 09/962,243, filed on Sep. 26, 2001, now Pat. No. 7,167,651, and a continuation-in-part of application No. 10/613,772, filed on Jul. 2, 2003, now Pat. No. 7,272,271.

(51) Int. Cl.
*H04B 10/00* (2006.01)
*H04J 14/00* (2006.01)
*H04J 14/02* (2006.01)

(52) U.S. Cl. .......................... 398/82; 398/163; 398/74; 398/91

(58) Field of Classification Search .................. 398/74, 398/75, 81, 82, 91, 147–150, 152, 158, 159, 398/163, 185, 192, 194, 200
See application file for complete search history.

(56) References Cited

U.S. PATENT DOCUMENTS

| | | | | |
|---|---|---|---|---|
| 4,829,598 A | * | 5/1989 | Auracher et al. | 398/204 |
| 5,146,359 A | * | 9/1992 | Okoshi et al. | 398/202 |
| 7,315,575 B2 | * | 1/2008 | Sun et al. | 375/229 |
| 7,471,903 B1 | * | 12/2008 | Friskney et al. | 398/185 |

\* cited by examiner

*Primary Examiner*—Dalzid Singh
(74) *Attorney, Agent, or Firm*—Nadya Reingand

(57) ABSTRACT

An optical device is provided with first and second inputs. A first coupler coupled is coupled to the first input and produces at least a first and second output. A second coupler is coupled to the second input and produces at least a first and second output. A third coupler is coupled to the first output of the first coupler and to the first output of the second coupler. A fourth coupler is coupled to the second output of the first coupler and to the second output of the second coupler. First and second crossing waveguides are provided with an angle selected to minimize crosstalk and losses between the first and second cross waveguides. The first crossing waveguide connects one of the first or second outputs from the first coupler with an input of the fourth coupler. The second crossing waveguide connects one of the first or second outputs from the second coupler with an input of the third coupler. A first phase shifter is coupled to the first and second waveguides. The first and second waveguides connect one of the outputs of the first or second coupler and one of the inputs of the third or fourth couplers. The first, second, third and fourth couplers, the two crossing waveguides and the phase shifter are each formed as part of a single planar chip made of an electro-optical material.

20 Claims, 9 Drawing Sheets

COHERENT OPTICAL DETECTOR AND COHERENT COMMUNICATION SYSTEM AND METHOD

CROSS-REFERENCE TO RELATED APPLICATIONS

This application is a continuation of Ser. No. 10/669,130 filed on Sep. 22, 2003 now U.S. Pat. No. 7,327,913. This application claims the benefit of the Provisional Patent Application Ser. No. 60/462,348 filed Apr. 11, 2003, and is also a continuation-in-part of U.S. patent application Ser. No. 09/962,243 filed Sep. 26, 2001 now U.S. Pat. No. 7,167,651 and Ser. No. 10/613,772 filed Jul. 2, 2003 now U.S. Pat. No. 7,272,271, all of which applications are fully incorporated herein by reference.

FIELD OF THE INVENTION

This invention relates generally to integrated electro-optical receiving device and their methods and use, and more particularly to electro-optical receiving devices formed on a single chip, and their methods of use, as well as optical communications systems and methods that utilize their coherent detection.

BACKGROUND OF THE INVENTION

Lasers are widely used today in fiber and free space segments for high data rate communication links, remote sensing applications (LIDAR) and more. In these applications the modulated light signal is modulated using electro-optical modulators and demodulated using, usually, electro-optical receiving devices.

In optical communications the modulation scheme commonly used is On-Off Keying (OOK), as illustrated in FIG. 1A and FIG. 1B, where only the power of the light is modulated. Alternative modulation schemes include Phase Shift Keying (PSK), where the data is encoded in the phase of the signal. In RF communications more advanced modulation schemes are used, such as Quadrature Phase Shift Keying) (QPSK) shown in FIG. 1C and Quadrature Amplitude Modulation (QAM) in FIG. 1D.

By using such communication schemes, for example, in optical communication systems, the capacity and link performance can be greatly enhanced in comparison with the direct detection schemes. In LIDAR, which is the extension of radar to the optical domain, the required shaping of the pulses can be achieved, such as chirped pulses, Barker coding, etc.

Such modulating formats as PSK (for example, BPSK and QPSK) were used mostly in the coherent communication systems (see, for example, L. G. Kazovsky, "Phase- and Polarization-Diversity Coherent Optical Techniques", J. of Lightwave Technology, Vol 7, N2, pp. 279-292, 1989). The majority of the work in this field was made by implementing non-integrated solutions, i.e. various optical components such as amplitude and phase modulators connected by optical fibers. Such communication schemes were abandoned in the late 1980's and are still not implemented due to their complexity and high cost.

For these applications and others, the light should be modulated both in amplitude and phase, essentially with a complex modulation signal. The cost is increased complexity of receivers in coherent detection schemes. The main problem is related to the development of compact, reliable, and low-cost receivers for such advanced modulating schemes.

At the receiver the received optical signal is mixed with the local oscillator signal by an optical interface that is usually based on one or more optical hybrids, such as directional hybrids, polarization splitters, and 90-degrees balanced hybrids. At the output from the optical interface, the optical field is converted into electric currents by one or more PIN photodiodes.

If the local oscillator and the received optical carrier have the same frequency, the electric currents provided by the photodiodes are baseband signals and the receiver is of the homodyne type. Respectively, if the local oscillator and the received optical carrier have different frequencies, the electric currents are shifted to the intermediate frequency (IF).

The present invention relates generally to the integrated phase diversity optical receiver designated to detect the optical signal, to mix it with another optical signal, to transform the signal into electrical domain for further processing. In-phase and in-quadrature detection can be applied to coherent optical receiver as a technique to measure simultaneously the phase and amplitude of the optical field, see for example, N. G. Walker, J. E. Carroll, "Simultaneous phase and amplitude measurements on optical signals using a multiport junction", Electronics Letters, Vol. 20, N23, 981-983, 1984 and T. G. Hodkinson, et al., "Demodulation of optical DPSK using in-phase and quadrature detection", Electronics Letters, Vol. 21, N19, 867-868, 1985.

Optical devices currently available are based on non-integrated and/or semi-integrated solutions, i.e. optical fibers or optical fiber-based components are used for connecting of various electro-optical components and/or splitting/combining the optical signals. There are no completely planar integrated solutions for the device that are capable to provide an arbitrary format demodulation (phase and/or amplitude modulation).

Other work in monolithic integration of some optical receivers have different implementations and/or are still far from being implemented in practical optical systems (see, for example, J. Saulnier et al. "Optical polarization-diversity receiver integrated on Titanium-diffused Lithium Niobate", IEEE Photonics Technology Letters, v.3. #10, 1991; F. Ghirardi et al. "InP-based 10 Ghz Bandwidth Polarization diversity heterodine photodetector with electrooptical adjustability," IEEE Photonics Technology Letters, v.6. #7, 1994; D. Hoffman et al. "Integrated optics eight-port 90-degrees hybrid on LiNbO$_3$" Journal of Lightwave technology, v.7. #5, 1989, pp. 794-798).

Accordingly, there is a need for integrated monolithic devices that provide demodulating of quadrature phase shift keying modulated signal (BPSK and/or QPSK) or quadrature amplitude modulated signal (QAM) by use of a single, monolithically integrated device. There is a further need for improved devices that is re-applicable for BPSK and/or QPSK communication systems, for LADAR as well as other remote sensing applications.

SUMMARY OF THE INVENTION

Accordingly, an object of the present invention is to provide an electro-optically adjustable optical device, its methods of use that measure simultaneously the phase and amplitude of the optical field.

Another object of the present invention is to provide an integrated single monolithic adjustable device to demodulate optical signals.

Yet another object of the present invention is to provide an integrated single monolithic adjustable device to demodulate optical signals for quadrature phase shift keying (BPSK and/or QPSK) optical data communication applications.

A further object of the present invention is to provide an integrated single monolithic adjustable device to demodulate optical signals for quadrature amplitude modulation (QAM).

Still another object of the present invention is to provide an integrated single monolithic adjustable device to demodulate optical signals for LADAR as well as other remote sensing applications.

Another object of the present invention is to provide a velocity finding system which utilizes a coherent communication incoming signal frequency deviation that corresponds to the Doppler shift to calculate the Velocity of a transmitting device with respect to the receiving device.

Yet another object of the present invention is to provides maneuverability measurement system that measures the incoming signal polarization deviation with respect to a receiving device.

A further object of the present invention is to provide a range finding system that compares GPS time stamps embedded in an incoming signal data stream with receiver time ticks locally that are generated by the GPS signal.

These and other objects of the present invention are achieved in an optical device with first and second inputs. A first coupler coupled is coupled to the first input and produces at least a first and second output. A second coupler is coupled to the second input and produces at least a first and second output. A third coupler is coupled to the first output of the first coupler and to the first output of the second coupler. A fourth coupler is coupled to the second output of the first coupler and to the second output of the second coupler. First and second crossing waveguides are provided with an angle selected to minimize crosstalk and losses between the first and second cross waveguides. The first crossing waveguide connects one of the first or second outputs from the first coupler with an input of the fourth coupler. The second crossing waveguide connects one of the first or second outputs from the second coupler with an input of the third coupler. A first phase shifter is coupled to the first and second waveguides. The first and second waveguides connect one of the outputs of the first or second coupler and one of the inputs of the third or fourth couplers. The first, second, third and fourth couplers, the two crossing waveguides and the phase shifter are each formed as part of a single planar chip made of an electro-optical material.

In another embodiment of the present invention, a method of transmission includes providing an optical device with first, second, third and fourth couplers. The two crossing waveguides and the phase shifter are each formed as part of a single planar chip made of an electro-optical material. A voltage is applied to the first, second, third and fourth couplers to maintain a desired power splitting ratio.

In another embodiment of the present invention, an optical communication system includes a transmitter and a receiver. The receiver includes, (i) a first coupler coupled to the first input and produces at least a first and second output, (ii) a second coupler coupled to the second input and produces at least a first and second output, (iii) a third coupler coupled to the first output of the first coupler and to the first output of the second coupler, (iv) a fourth coupler coupled to the second output of the first coupler and to the second output of the second coupler, (v) first and second crossing waveguides with an angle selected to minimize crosstalk and losses between the first and second cross waveguides, the first crossing waveguide connecting one of the first or second outputs from the first coupler with an input of the fourth coupler, the second crossing waveguide connecting one of the first or second outputs from the second coupler with an input of the third coupler. A first phase shifter is coupled to the first and second waveguides. The first and second waveguides are connected to one of the outputs of the first or second coupler and one of the inputs of the third or fourth coupler. The first, second, third and fourth couplers, the two crossing waveguides and the phase shifter are each formed as part of a single planar chip made of an electro-optical material.

DETAILED DESCRIPTION OF THE PREFERRED EMBODIMENTS

Figure 1A:
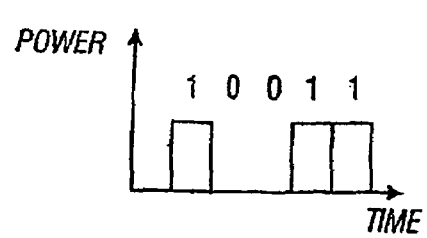
FIG. 1(a) illustrates the optical communication modulation format OOK.
Figure 1B:
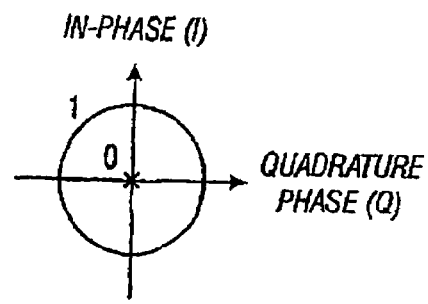
FIG. 1(b) illustrates the QPSK optical communication modulation format; (c) and (d) illustrate data encoding in QPSK and QAM respectively.
Figure 1C:
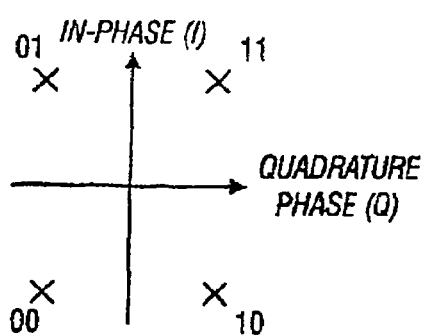
Figure 1D:
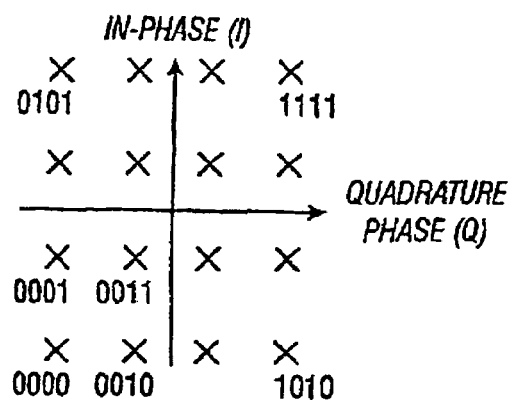
Figure 2A:
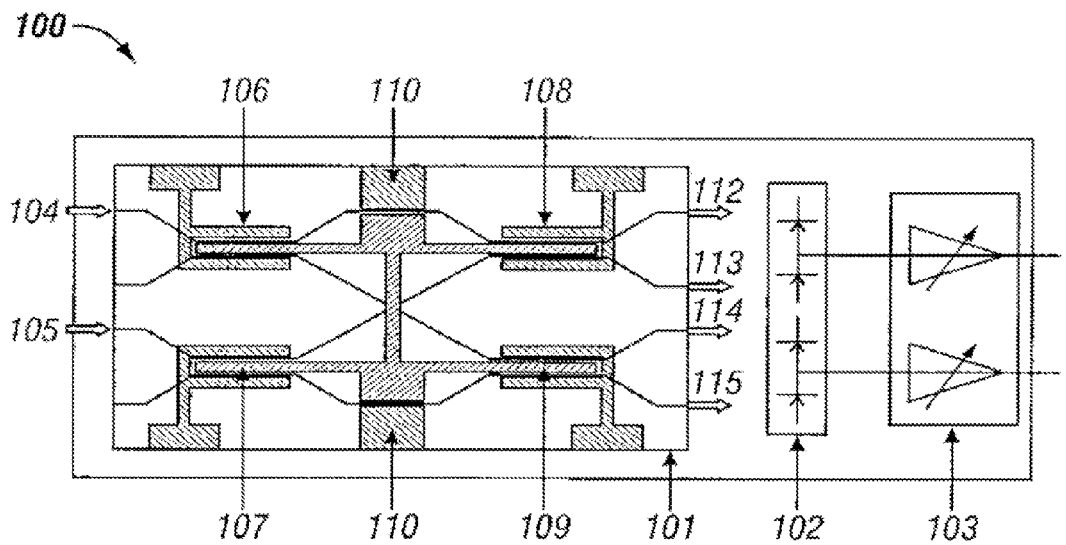
FIG. 2(a) is a schematic diagram of one embodiment of a 90-degrees optical hybrid of the present invention.

In one embodiment of the present invention, an optical device, such as optical device 200 illustrated in FIG. 2(a), hereafter the "Optical Device", is provided that includes a first device input, and a second device input, first, second, third and fourth couplers (mixers) and first, second, third and fourth device outputs. Each coupler includes two adjacent waveguides providing the mixing of the optical signals propagating in these adjacent waveguides. The first and second device inputs both are connected, respectively, to the first coupler and the second coupler.

One output of the first coupler is connected to one input of the third coupler while another output of the first coupler is connected to the one input of the fourth coupler. An output of the second coupler is connected to another input of the fourth coupler while another output of the first coupler is connected to another input of the third coupler. The Optical Device further includes two crossing waveguides, which cross each other. The first crossing waveguide connects the one output of the first coupler and another input of the fourth coupler. The second crossing waveguide connects the one output of the first coupler and another input of the third coupler. The Optical Device also includes at least one phase shifter positioned between two locations. The first location is one of the outputs of the first or second coupler. The other location is one of the inputs of the third or fourth couplers, which corresponds (connected by a crossing waveguide) to the first location. The first and second outputs of the third coupler produce the first and second device outputs, respectively. The first and second outputs of the fourth coupler produce the third and fourth device outputs, respectively.

The first, second, third and fourth couplers, two crossing waveguides and the phase shifter can each be formed as part of a single planar chip made of an electro-optical material. A variety of different processes are utilized in making the single planer chip, as disclosed in R. C. Alferness in "Ti Diffused LiNbO$_3$ waveguide devices", "Guided Wave Opto-electronics", Ed. T. Tamir, Springer-Verlag, 1988; and Wei-Lin Chen, et al. "Lithium Niobate Ridge Waveguides by Nickel Diffusion and Proton-Exchange and Wet Etching", IEEE Photonics Technology Letters Vol. 7 No. 11, 1995, all incorporated herein by reference.

In various embodiments, the chip is a monolithic piece of a wafer that can be made of semiconductor or ferroelectric materials including but not limited to LiNbO$_3$, and the like. In various embodiments, different effects relative to the output of the chip of the present invention are possible, including but not limited to, (i) thermo-optical, (ii) electro-optical, (iii) electro-absorption, and the like can be utilized with the Optical Device. The electro-optical material, which can be LiNbO$_3$, can be cut at X, Y, or Z planes. The Optical Device of the present invention can utilize a variety of different processes in its creation, including but not limited to, metal in-diffusion and/or (annealed) protonic-exchange technology, wet etching, reactive ion (beam) etching, plasma etching, and the like.

Integration of components in a single chip, such as LiNbO$_3$ and the like, can, among other things, reduce cost, improve performance, and provide better stability and control. The Optical Device of the present invention, when integrated on a single chip and/or in single package, can be used for various applications, including those that require simultaneous measurement of phase and amplitude of the optical field.

In one embodiment of the present invention, the optical input of the Optical Device has as input signal that is modulated in phase/amplitude, such as by way of illustration, quadrature phase shift keying (QPSK) or quadrature amplitude modulation (QAM), for communications, or controlled chirp or Barker coding for LADAR applications.

FIG. 2(a) illustrates an embodiment of Optical Device 100 that is a 90-degrees optical hybrid. The chip can be cut at the X plane. In this embodiment, the single chip, made of electro-optical material, the balance receivers and/or TIAs are all formed a part of a single integrated package.

In this embodiment, the two incoming light signals impinge the Optical Device 100 through the inputs 104 and 105, each subsequently divided into two optical signals. The division can be achieved by a variety of different ways, including but not limited to use of 3 dB couplers 106 and 107, respectively. The light from coupler 106 further directed to the couplers 108 and 109 and light from coupler 107 further directed to the couplers 108 and 109, in such a way that the crossing waveguide structure 111 is produced. The two, preferably 3 dB, couplers 108 and 109 further mix the corresponded input signals and produce four optical outputs 112, 113, 114 and 115. At least one phase shifter 110 is placed on waveguide structure 111 in-between the first set of the couplers 106 and 107 and the second set of the couplers 108 and 109. The beam which passes through the phase shifter 110 gains the additional phase shift. Output optical fields 112, 113, 114, 115 are converted into electric currents by four PIN photodiodes 102. It will be appreciated that device other than the four PIN photodiodes 102 can be utilized. Each pair of balanced receivers is connected to a corresponding transimpedance amplifier 103.

Figure 2B:
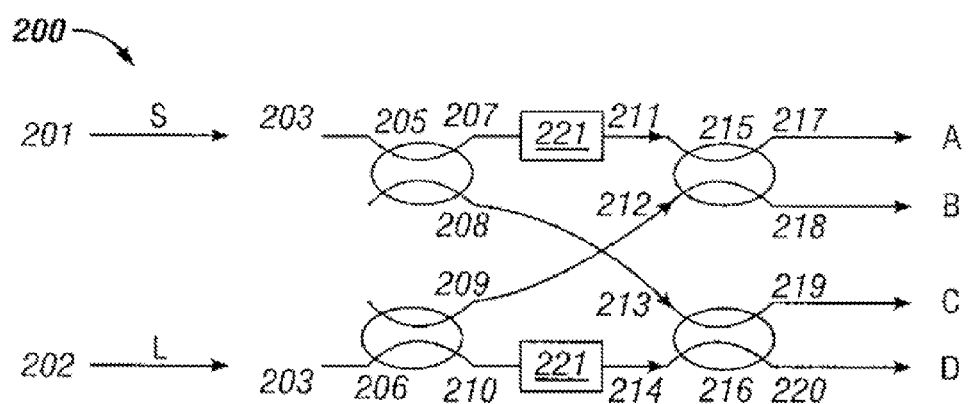
FIG. 2(b) is a schematic diagram illustrating a quadrature receiver of the present invention.

A block diagram of a "quadrature receiver" embodiment of an Optical Device 200 of the present invention, is shown in FIG. 2(b). Two incoming optical signals 201 and 202, called, respectively, the signal S and the local oscillator L, impinge two inputs 203 and 204 of the optical hybrid. Passive couplers or splitters 205, 206 divide the light coming from input S and L into four, preferably equal beams 207, 208, 209 and 210.

The beam 207 passes through phase shifter 221 and gains the additional phase shift. It will be appreciated that additional phase shifters 221 and gains the additional phase shift. It will be appreciated that additional phase shifters 221 can be included. Additional bias can be applied to phase shifter 221 in order to obtain the desirable phase shift.

Beams 211 and 212 are mixed together by directional coupler 215. Beams 213 and 214 are mixed together, respectively, at the directional coupler 216. Couplers 215 and 216 intrinsically introduce the 90-degrees phase shift between two outcoming signals. Bias voltages can be applied to each coupler 205, 206, 215 and 216 to set the 3 dB splitting operating point.

The resulting four output signals A, B, C, D, that come from outputs 217, 218, 219 and 220, can all have an adjustable relative phase difference with respect to each other. The first two outputs can provide the cosine of the relative phase between S and L after balanced detectors. The last two outputs can provide the sine of the relative phase.

If couplers 205, 206, 215 and 216 all are 3 dB couplers, and the single phase shift 221 provides 90-degrees phase shift, then all four outputs 211, 212, 213 and 214 have 90-degrees relative phase difference of the form:

$\{A=S+L, B=S-L, C=S+jL\ D=S-jL\}$.

The outputs of the S and L after balanced detector are sampled and processed.

Couplers 206, 207, 215 and 216 can be based on an alternating $\Delta\beta$ electrode geometry as illustrated in A. Yariv and P. Yeh, Optical waves in crystals, Chapter 11, Wiley-Interscience, incorporated herein by reference, in order to ensure the occurrence of power crossover within fabrication tolerance of couplers 205, 206, 215 or 216. In this configuration, each coupler 205, 206, 217 and 216 has electrodes 310 (FIG. 3a, b) that are split into two parts in a manner so that the voltage has a reversed polarity at each section.

Figure 3A:
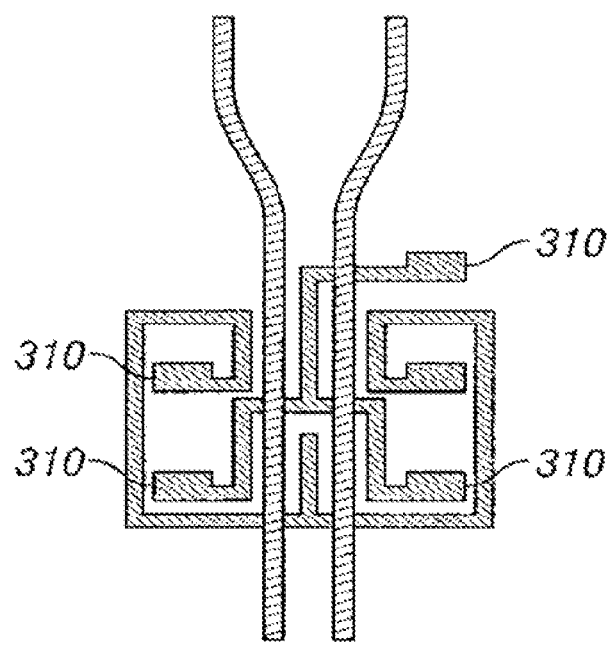
FIGS. 3a and b illustrate that the tunable 3 dB couplers from FIG. 2(b) can be based on an alternating $\Delta\beta$ electrode geometry.
Figure 3B:
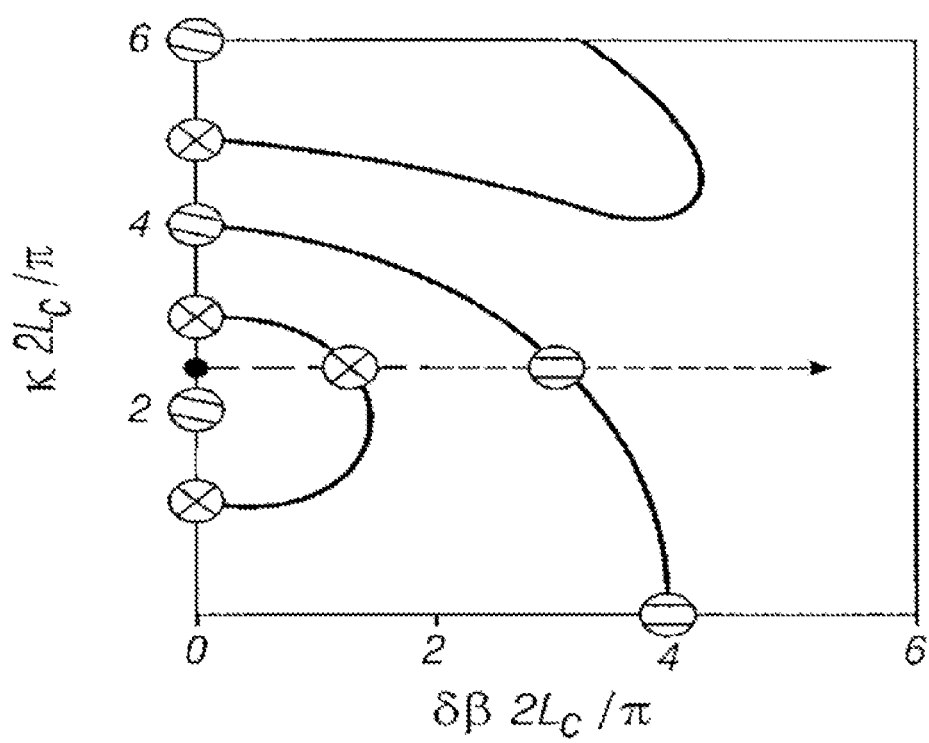

When couplers 205, 206, 215 and 216 are 3 dB couplers, the 3 dB-working point of each coupler 205 through 216 is optimized from considerations of optimal sensitivity to applied voltage and reduced sensitivity to variations in diffusion conditions, as more fully illustrated in FIG. 3a, b. This makes couplers 205 through 216 less sensitive to diffusion variations, resulting in an increase in manufacturing yield.

Figure 4:
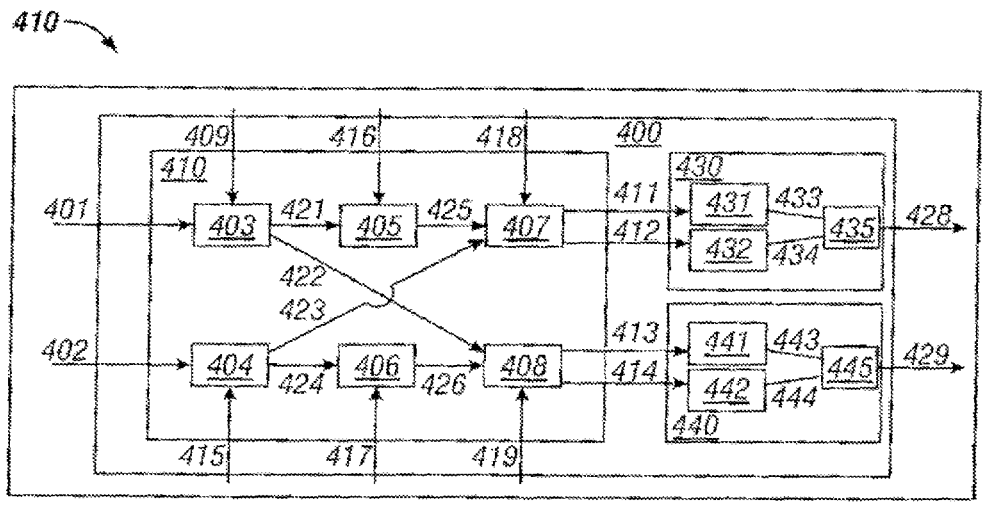
FIG. 4 illustrates one embodiment of a coherent receiver of the present invention.

Referring now to FIG. 4, one embodiment of the present invention is a coherent receiver 400 that includes a 90-degrees optical hybrid 410 and 2 pairs of balanced detectors 430 and 440. Optical hybrid 410 has two optical inputs 401 and 402 and four optical outputs 411, 412, 413, 414. When two optical signals S and L are provided to inputs 401 and 402, the following optical signals are at outputs 411, 412, 413 and 414::S+L, S−L, S+jL, S−jL respectively. Optical hybrid 410 can have various configurations. In one embodiment, optical hybrid 410 has four directional couplers 403, 404, 407, 408 and two phase shifters 405, 406. Regulating voltages 409, 415, 418, and 419 are applied to each of the directional couplers to assure equal power splitting between its two outputs by controlling the "coupler phase" $\beta_i$. Regulating voltages 416 and 417 are applied to phase modulators 405 and 406 in order to control the phase shifting angle by controlling the phase shift parameter $\gamma_i$. Each balanced detector 430 and 440 has a pair of balanced (equal characteristics) photodiodes 431, 432 and 441, 442, followed by a Trans-Impedance Amplifier (TIA) 435 and 445 respectively. The output signals from coherent receiver 400 come out via the electrical outputs 428 and 429.

In one embodiment, referred to as the digital implementation, the outputs of balanced detectors 430 and 440 are sampled and processed. In the analog self-homodyne implementation, the inputs are the received signal S and a delayed replica of it delayed by one symbol $S_d$. Outputs 428 and 429 provide the real and imaginary part of $SS_d{}^* e^{-j\pi/4}$. Each output 428 and 429 only need to be compared to zero in order to recover the transmitted bit.

Calibration maintains certain performance parameters of the coherent detector internal subassemblies as follows:

For directional coupler 403, equal splitting of light energy into outputs 421 and 422 can be achieved by controlling the 'coupler phase' $\beta_1$ via control line 409.

For directional coupler 404, equal splitting of light energy into outputs 423 and 424 can be achieved by controlling the 'coupler phase' $\beta_2$ via control line 415.

For directional coupler 407, equal splitting of light energy into outputs 411 and 412 can be achieved by controlling the 'coupler phase' $\beta_3$ via control line 418.

For directional coupler 408, equal splitting of light energy into outputs 413 and 414 can be achieved by controlling the 'coupler phase' $\beta_4$ via control line 419.

For phase shifters 405 and 406, 90-degrees relative phase difference between inputs 423 and 425 (e.g. S and L) and 422 and 426 (e.g. S and jL), and for the analog self-homodyne implementation to ensure that the constellation absolute alignment is correct (e.g. optical outputs S and $e^{j\pi/4 S_d}$, and S and $je^{j\pi/4 S_d}$), can be achieved by controlling the phase shift parameters $\gamma_1$ and $\gamma_2$ via control line 416 and 417.

Figure 5:
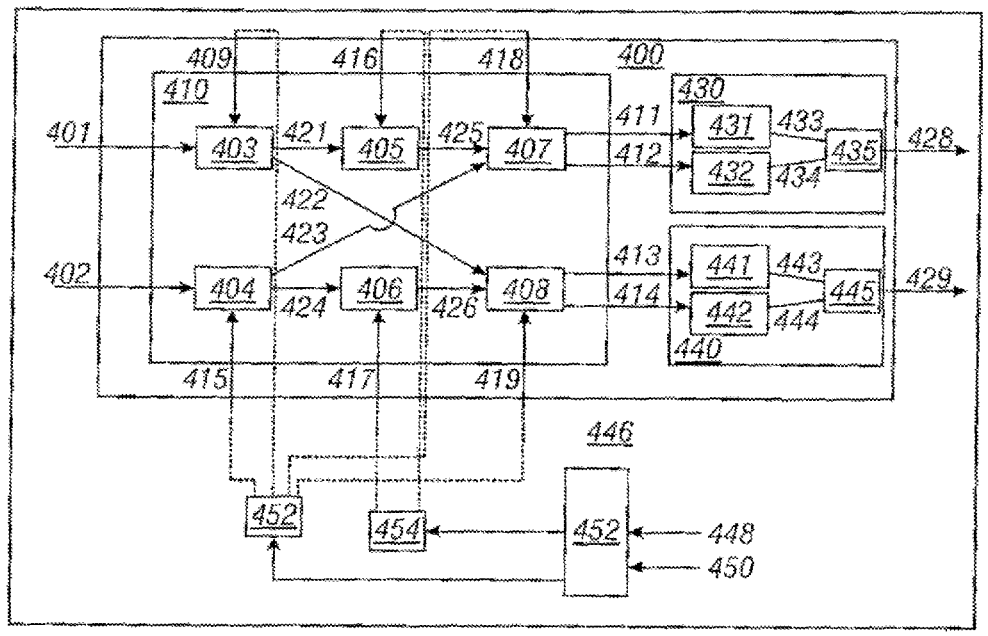
FIG. 5 illustrates one embodiment for a digital calibration scheme for the FIG. 4 coherent receiver.
Figure 6:
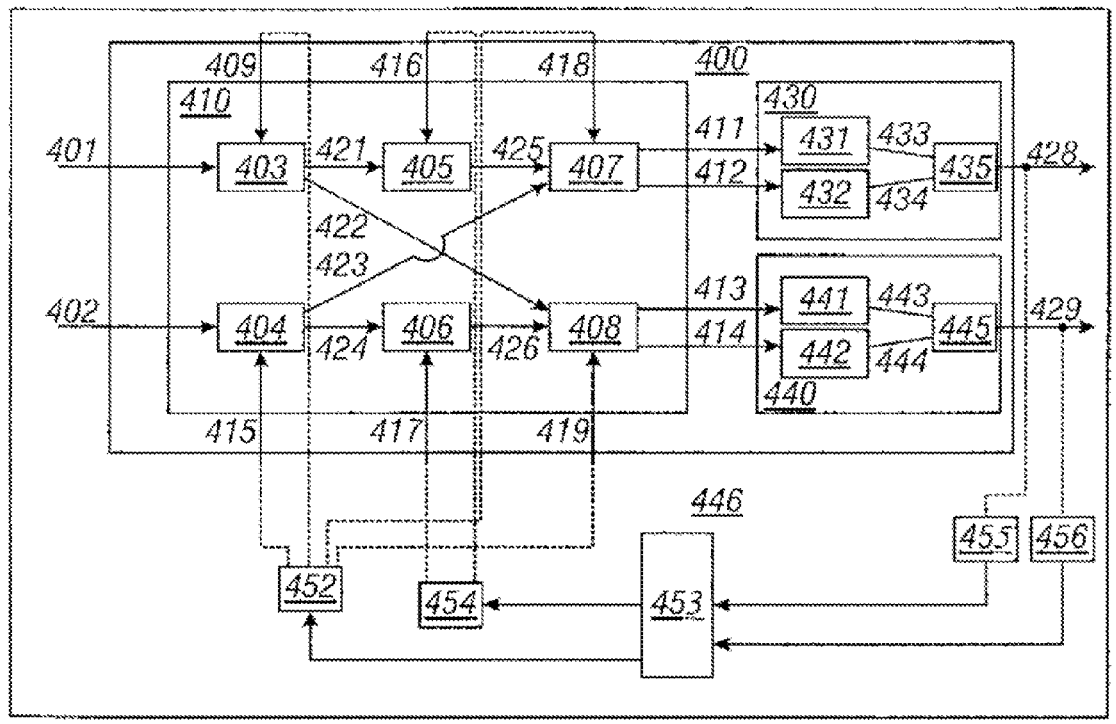
FIG. 6 illustrates one embodiment for an analog self-homodyne calibration scheme for the FIG. 4 coherent receiver.

Coherent receiver 400 can be calibrated digitally, as FIG. 5, or in an analog self homodyne manner, as illustrated in FIG. 6 with the calibration block marked as 446. Referring to FIG. 5, coherent receiver 400 is digitally calibrated. Coherent detector outputs 428 and 429 can be connected to two fast (symbol rate) A/D converters for further digital signal processing. Digital samples 448 and 450 are processed by processor 453.

In the analog self-homodyne implementation embodiment, illustrated in FIG. 6, coherent detector analog outputs 428 and 429 can be tapped and sampled by two A/D converters 455 and 456. The A/D outputs are directed to processor 453. These A/Ds can have bandwidths lower than the symbol rate, since they are used while keeping the symbols constant during the A/Ds integration time (training).

Processor 453 collects samples of inputs 448 and 450, and estimates their statistical properties, and performs the control algorithms as described below.

The algorithm results are applied to a set of controllers. The processor controls the coupler phases $\beta_i$ via the coupler phase controller 452. The phase shifts $\gamma_i$ are controlled by 454.

The calibration process is divided into two stages: (i) initialization, to be performed at the Optical Device start-up and resets, and (ii) online tracking, carried out continuously during operation (on training sequences or on actual payload). When optical polarization compensation is used, the initialization stage assumes that it is set correctly. The input signal to the Optical device of the present invention includes data points that have all constellation points with equal probability. In one embodiment, the data points have constellation points with a maximum length sequence. In the analog implementation embodiment, the symbols are kept constant during the A/Ds integration time.

In one embodiment, the following algorithm is used to initialize the coupler phase (and therefore ensure equal splitting of light energy at the coupler output) of 407 408 and 403 and 404 (in that order). It will be appreciated that the present invention is not limited to these algorithms, and that a variety of other algorithms can be used.

Initializing 407 'coupler phase' to $\pi/4 + k_1 \pi/2$, where $k_1$ is an integer (representing a $\pi/2$ ambiguity), can implement the following:

1. Adjust control line 409 via controller 452, to maximize the variance of output 428.
2. Adjust control line 409 via controller 452, to maximize the variance of output 428.
3. Adjust control line 415 via controller 452, to maximize the variance of output 428.

Initializing 408 'coupler phase' to $\pi/4 + k_2 \pi/2$ can utilize the following:

1. Adjust control line 409 via controller 452, to maximize the variance of output 429.
2. Adjust control line 415 via controller 452, to maximize the variance of output 429.
3. Adjust control line 419 via controller 452, to maximize the variance of output 429.

The initialization of both 403 and 404 'coupler phase' to $\pi/4 + k_3 \pi/2$, $\pi/4 + k_4 \pi/2$ can utilize the following:

1. Adjust control lines 409 and 415 at the same time via controller 452, to maximize the sum of the two variances at the outputs 428 while,
2. Maintaining the variance of output 428 equal to the variance of the output 429.

In one embodiment, the following algorithm is used to initialize both phase shifters 405 and 406, to assure 90-degrees. Again, the algorithms are not limited to the examples below and a variety of other algorithms can be used.

For the initialization of both 405 and 406, the following actions can be taken:

1. Adjust control lines 416 and 417 at the same time via controller 454, to cancel the covariance of the two outputs 428 and 429 while, (for the analog self-homodyne embodiment only) minimizing the expected value $E\{((v_1-E\{v_1\})^2-(v_2-E\{v_2\})^2)^2\}$, where $v_1$ is the measured sampled set at the output 428, $v_2$ is the measured sampled set at the output 429.

In the digital implementation embodiment, the algorithm can be performed on any input data, including actual payload (provided that it is scrambled, where all constellation points have equal probability). In the analog implementation embodiment, the algorithm can work on training sequences, where each symbol is repeated at least for the integration time of the slow A/Ds.

The following algorithm can be utilized to track the coupler phase of 407, 408, 403 and 404. Again, the present invention is not limited to these algorithms, which are presented by way of example and without limitation.

To track the coupler phase of 407, 408, 403 and 404, the following can be utilized.

1. Adjust control line 418 via controller 452, to maximize the variance of output 428.
2. Adjust control line 419 via controller 452, to maximize the variance of output 429.
3. Adjust control lines 409 and 415 so that the variance of output 428 is equal to the variance of output 429, while
4. Maximizing the sum of the two variances at outputs 428 and 429.

The following algorithm can be utilized to maintain the phase of both phase shifters 405 and 406. Again, the algorithms are provided by way of examples and without limitation. To maintain the phase of both phase shifters 405 and 406, the following can be utilized.

1. Adjust control lines 416 and 417 at the same time via controller 454, to cancel the covariance of the two outputs 428 and 429, while
2. For the analog self-homodyne embodiment only, minimizing $E\{((v_1-E\{v_1\})^2-(v_2-E\{v_2\})^2)^2\}$, where $v_1$ is the measured sampled set at the output 428, $v_2$ is the measured sampled set at the output 429.

The Optical Device of the present invention can be utilized for wavelength selectivity by filtering optical signals in the electrical domain. In various embodiment, the Optical Device of the present invention can be utilized in a variety of different of applications and field, including but not limited to photonics and opto-electronics: communications, LADARs, sensing, and the like. In various embodiments, the Optical Device of the present invention can be utilized to provide inherent frequency selectivity and enables the incorporation of wavelength agility, by way of illustration into a communications link, without reliance on narrowband tunable optical filters. With the Optical Device of the present invention, the preservation of signal phase information, in the electrical domain, enables the implementation of a digital polarization diversity receiver without reliance on optical components, thus making polarization multiplexing and polarization agility implementable.

One embodiment of a coherent receiver of the present invention is illustrated in FIG. 4. The tunable laser (not shown) that serves as a local oscillator impinges the receiver from input 402. It is phase-locked to the incoming signal 401. The PLL can be either implemented optically via the electrical output control signal 429, or in digital signal processor DSP by digital multiplication of the sampled symbols.

The 90-degrees optical hybrid 410 and the balanced detectors 430, 440 act as a mixer, that down-converts the input signal from the optical band at 401 to the electrical baseband. Because the transformation is linear, all of the filtering, for noise reduction and separation of carries, can be performed in the electrical domain, with no reliance on narrow optical filtering. The electrical output signals from the balanced detectors 428 and 429 that are connected to the DSP, provide a low-passed sample proportional to the Re{SL*} and Im{SL*} respectively. The samples are processed by the DSP, which further filters out the desired wavelength, recovers its original polarization, and keeps the tunable laser phase-locked to the incoming signal at 401.

The Optical Device of the present invention can perform wavelength selectivity by filtering the signals in the electrical domain. A desired carrier can be recovered by changing the wavelength of the tunable laser. Some time, in the order of microseconds, is needed to relock the tunable laser onto the incoming data stream at 401. There is no need for narrow tunable optical filters who's tuning and settling time are on the order of several milliseconds, because the local oscillator transfers the filtering function linearly to the electrical domain.

With the Optical Device of the present invention, no optical components are required in order to recover the polarization state of the incoming signal at 401. The linear transformation of the signal from the optical to the electrical domain, and its digitization, enables the performance of digital polarization compensation (in the DSP), thus avoiding the problematic use of slow, non-endless optical polarization compensators, and the incurring losses.

The Optical Device of the present invention can be utilized in communication application where spectral efficiency is critical. Analysis, not shown, for signal source from fiber and for free-space signal sources shows that the coherent detection described above does not require optical channel prefiltering. The filtering is carried out by the receiver itself. No optical filters are used to separate carriers in a receiver application (since the de-multiplexing is not Lambda based). Therefore, the communication channels can be packed more closely, relying on the disclosed electrical filters to perform the separation. Calculation results show that even when 160 channels are present in the optical filter passband, the penalty in the receiver is minimal. Accordingly, the wavelength selection system discussed above can indeed enable the direct electronic filtering of a heavily populated C-band with hundreds of channels hopping simultaneously, delivering a capacity of 6.4 Tbps.

The Optical Device of the present invention can be utilized for compensation of communications errors caused by angular misalignment of the transmitter and receiver apertures and by the light dispersion in the transmission medium.

Figure 7:
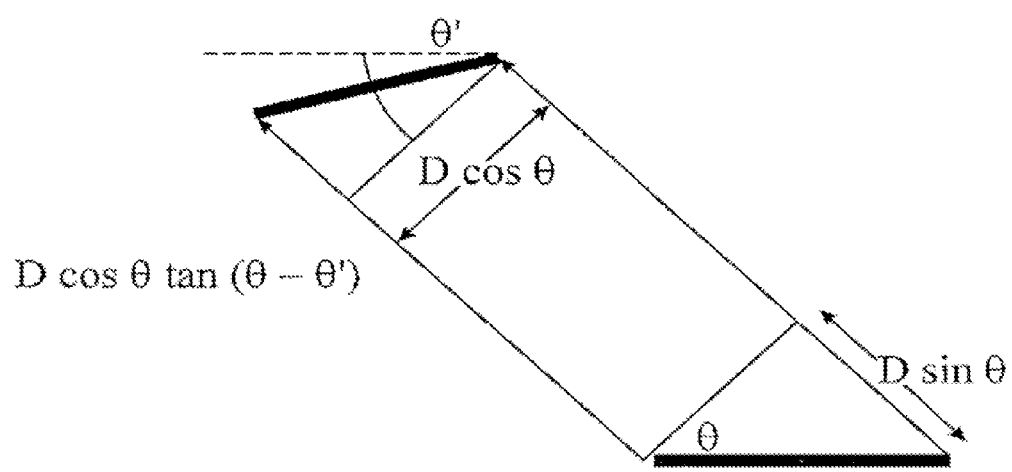
FIG. 7 illustrates angular misalignment, or non-bore sighting, between the Tx and Rx apertures that leads to a continuous time delay of the signals across the optical beam at the detector.

Inter-symbol interference (ISI) is result of spreading of the signal pulse's time slot to its neighboring pulses' time slots. Pulse spreading can be caused by dispersion of the transmission medium such as optical fibers. In free-space optical communications, the dispersion of the transmission medium is negligible. However, pulse smearing at the receiver occurs as a result of relative angular misalignment between the transmitter and receiver aperture due to beam steering, as illustrated in FIG. 7. The relative orientation of the transmitter and receiver boresights cause a "smearing" of the pulse by $\Delta = D (\sin\theta - \cos\tan(\theta-\theta'))/(c\,T) = D (\sin\theta'/\cos(\theta-\theta')/(c\,T)$ (normalized to the pulse length), where D is the aperture length, c is the speed of light, T is the symbol repetition interval, $\theta$ is the transmission angle (from boresight) and $\theta'$ is the receiver to transmitter boresight angle difference as shown in FIG. 7.

With the Optical Device of the present invention a variety of different approaches can be utilized to overcome ISI of the optical pulses including but not limited to, (i) implementing pulsed LO at a coherent receiver to reduce the effect of the ISI compared with CW LO, (ii) digital signal processing, in particular the use an adaptive transversal filter as a channel equalizer, and the like.

Figure 8A:
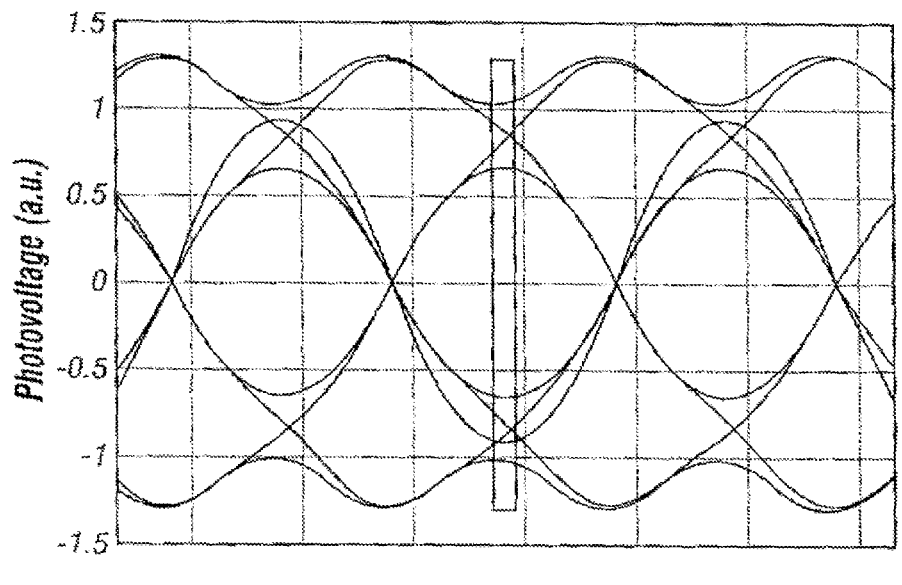
FIG. 8(a) is a simulated eye diagram of the received RZ-QPSK signal with CW LO and delay of 1.3258 of the symbol period (106.1 ps). $Q^2$=16.3 dB.
Figure 8B:
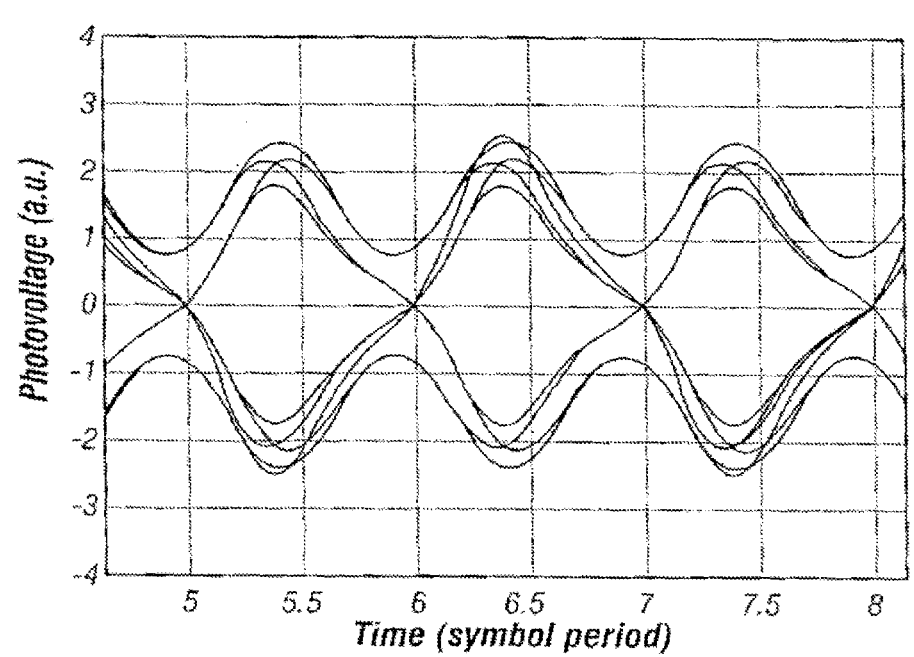
FIG. 8(b) is a simulated eye diagram of the received RZ-QPSK signal with pulsed LO and delay of 1.3258 of the symbol period (106.1 ps).

In one embodiment of the present invention, a pulsed local oscillator (LO) samples the input optical signal, and captures and amplifies the signal power within a narrow time window defined by the pulse width of the pulsed LO. As a result, a narrower signal pulse is produced compared with cw LO. The signal pulse is therefore effectively reshaped by the pulsed LO. Such pulse reshaping are possible with cw LO only. The reshaped signal pulses have reduced ISI degradation compared with signal pulses detected using cw LO as it is shown in the results of simulation experiments presented in FIGS. 8(a) and 8(b). FIG. 8(a) shows the eye diagram as the result of the signal detection with cw local oscillator. The delay is 106.1 ps. The signal was modulated with data using quadrature phase shift keying (QPSK) format. FIG. 8(b) shows the same results but with the pulsed LO used.

The use of pulsed LO as a time-gated amplifier for coherent detection provides the following, (i) robustness to inter-symbol interference as a result of pulse reshaping, with the pulsed LO enabling temporal sampling of the input signal to time gate and reshape the input signal pulse, (ii) performs time filtering of unwanted optical signal from energy spreading from adjacent pulses.

If the input signal is amplified, for example by EDFA with added broadband ASE noise, the pulsed LO can perform time-domain filtering and suppress signal-spontaneous beat noise. This is not achievable with a spectral filter. The pulsed LO acts like an optical gate when the pulsed LO is absent the photocurrent is very small or zero because the photocurrent is proportional to the square root of the product of the LO power and the signal power for balanced detection. Noise, such as ASE in the input signal, is cut off when the pulsed LO is off. ASE is reduced by the duty cycle of the pulsed LO. With pulsed LO of the present invention there is, among other things, (i) a reduced saturation effect of the photodetector compared to cw LO, (ii) an improvement in sensitivity due to higher peak power, (iii) an adaptation to coherent detection of OTDM signal, (iv) an adaptation to optical sampling, optical ADC, and optical demultiplexing, and the like.

Because the optical signal is down-converted linearly to the electrical baseband and digitized, digital processing methods used in RF systems can be utilized for implementation of the Optical Device of the present invention in DSP. In one specific embodiment, the Optical Device of the present invention is utilized for communication channel equalization and compensation for linear channel distortion, including but not limited to chromatic dispersion and PMD in fiber, for atmospheric effects in free space communications, and the like. In one embodiment, use of the Optical Device of the present invention provides an improvement of the signal BER due to the beam steering equalization when the equalization DS is applied.

Figure 9:
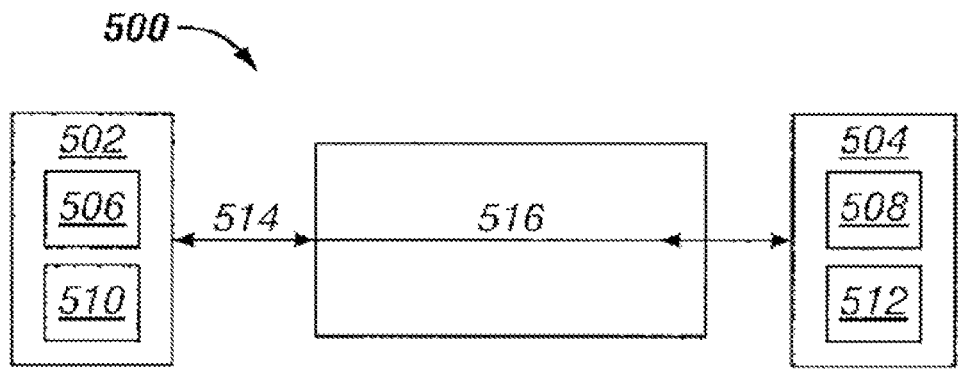
FIG. 9 is a schematic diagram of an optical communication system of the present invention.

Referring now to FIG. 9, a block diagram of a communication system 500 is shown, where 502 and 504 are transceivers that include transmitters 506, 508 and coherent receivers 510 and 512, correspondingly. Transceivers 502 and 504 are located at certain distances from each other, and a light beam 514 passes a transmission medium 516 including but not limited to, fiber, air, space, and the like before it reaches the opposite transceiver 502 or 504 respectively.

Figure 10A:
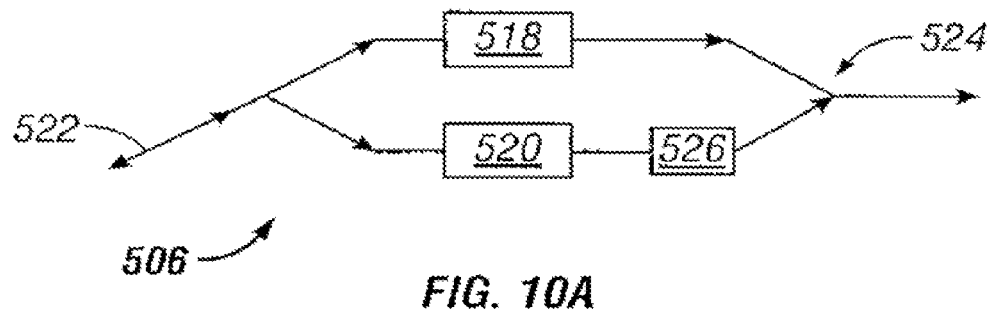
FIG. 10(a) illustrates one embodiment of a transmitter of FIG. 9 that includes Mach-Zehnder modulators.

In one embodiment, illustrated in FIG. 10(a), transmitters 506 and 508 from FIG. 9 are optical devices as disclosed in application Ser. No. 10/613,772, filed Jul. 2, 2003, incorporated by reference, and include, a first Mach-Zehnder modulator 518 that produces a first output, and a second Mach-Zehnder modulator 520, which produces a second output. The first and second Mach-Zehnder modulators 518 and 520 are coupled to an input splitter 522. A combiner 524 combines the first and second outputs from first and second Mach-Zehnder modulators 518 and 520. A phase shifter 526 is coupled to the first and/or second Mach-Zehnder modulators 518 and 520. The first Mach-Zehnder modulator 518, second Mach-Zehnder modulator 520, input splitter 522, combiner 524 and the phase shifter 526 are each formed as part of a single chip made of electro-optical material.

Figure 10B:
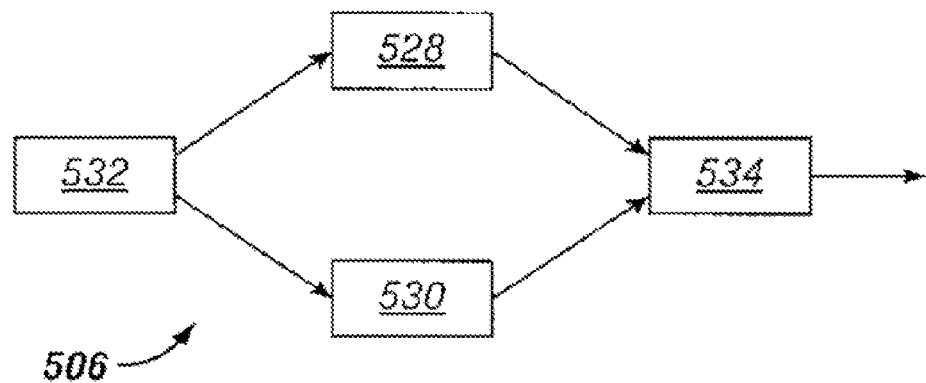
FIG. 10(b) illustrates an embodiment of a transmitter of FIG. 9, where the transmitters are quadrature modulators operating with the light in two (orthogonal) polarization states.

In another embodiment, illustrated in FIG. 10(b) transmitters 506 and/or 508 are quadrature modulators operating with the light in two (orthogonal) polarization states. The quadrature modulator, operating with two polarization states of light, is disclosed in the Ser. No. 10/613,722 and includes two quadrature modulators 528 and 530 integrated in one chip. Each modulator 528 and 530 operates with the light of one particular polarization state. A beam splitter 532 is used to separate the light with orthogonal polarizations at the entrance of the device and direct each polarization light into a separate modulator. A combiner 534 is used to combine back after modulation the light with different polarizations. The resulting output signal consists of two quadrature-modulated signals, each of different (orthogonal) polarization.

In one embodiment, communications system 500 is WDM bi-directional optical communications system is disclosed with at least 2 bits/s/Hz spectral efficiency using QAM modulation format and polarization-division-multiplexing. A return-to-zero (RZ) coding of the QAM signal is used to enhance transmission performance and receiver sensitivity. By way of illustration, and without limitation, the channel spacing can be 25 GHz. For fiber communications, a fiber bandwidth of approximately 200 nm (1450-1650 nm) can be utilized to provide a capacity of 100 Tbits/s or 0.1 Petabits/s using communications system 500 with 1000 wavelength channels. Coherent homodyne detection of the QAM channels, using analog and/or digital signal processing for polarization control as well as phase and frequency synchronization of the local laser, provides high receiver sensitivity performance.

In another embodiment, the Optical Device of the present invention is used for coherent detection of range/velocity and orientation measurement in optical communications links optical communications between moving platforms. This provides a determination of transmitter and receiver velocities, position and maneuver, and eliminates the error associated with this movement.

Figure 11:
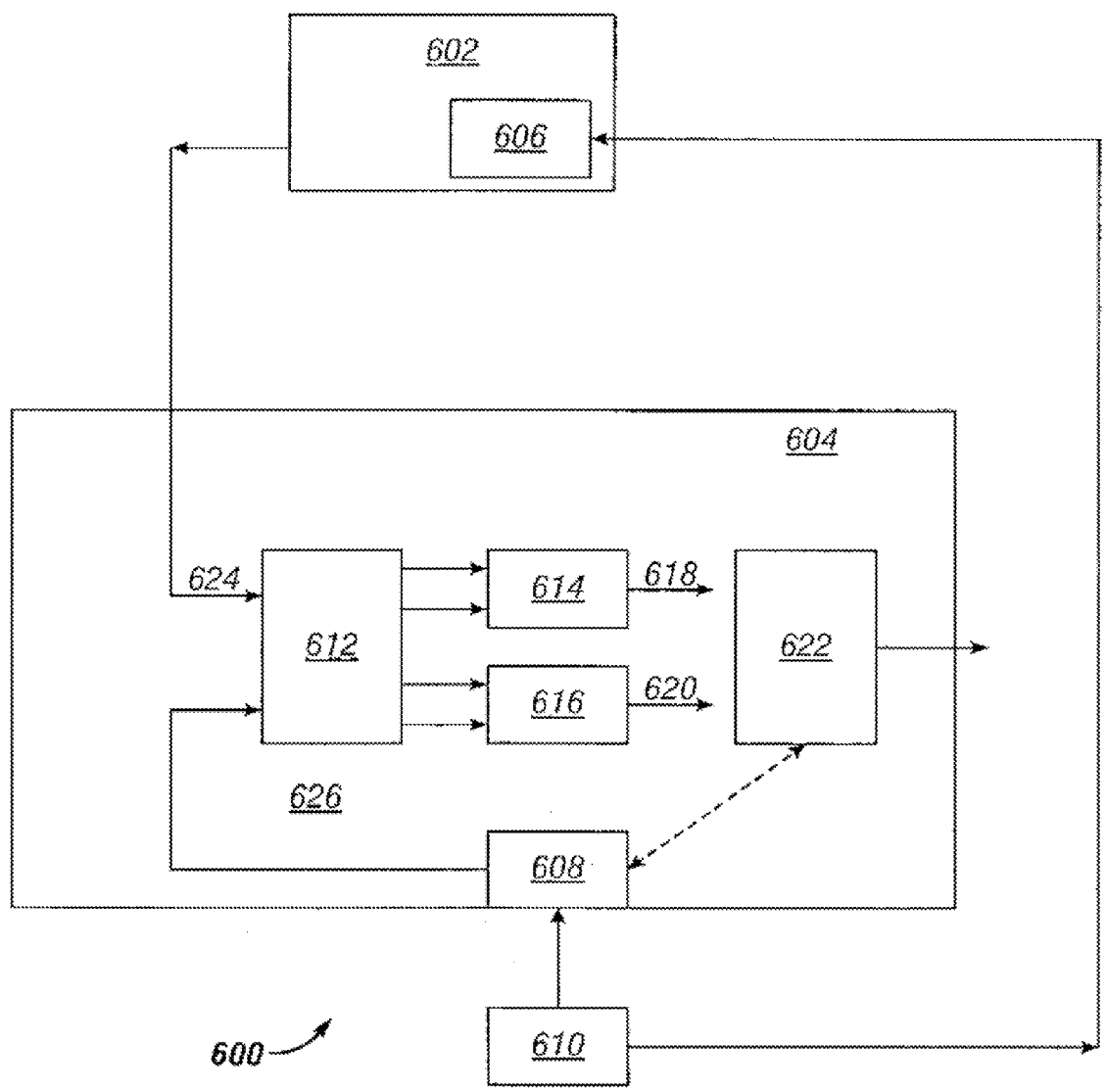
FIG. 11 illustrates a fully coherent digital free-space-optical communication link embodiment of the present invention.

The present invention can provide range, velocity, and orientation measurement as a byproduct of a fully coherent digital free-space-optical communication link 600, illustrated in FIG. 11. In this embodiment, there is no need for a separate 'range finding' apparatus. The coherent transmitter 602 and receiver 604 at each side of the optical communication link are part of a digital loop. The frequency of the two lasers 606 and 608 at the two ends of the coherent communication link 600 and are locked to the same atomic line source 610, which may be provided by GPS, within a predetermined frequency deviation that corresponds to the system Doppler shift velocity resolution. A homodyne coherent optical receiver consists of an optical mixer (90-degrees optical hybrid 612 followed by photodetectors 614 and 616) with electrical outputs 618 and 620, linearly down-converting the input signal from the optical band to the electrical baseband. The optical mixer electrical output signals 618 and 620 are connected to a Digital Signal Processor (DSP) 622 which process samples proportional to the real and imaginary portions of the incoming signal.

The samples are processed with DSP 622, which in addition to recovering the incoming message data, performing the following, (i) calculation of the incoming signal phase deviation which corresponds to the Doppler shift, (ii) recovers the incoming signal original polarization as compared with the local laser polarization, (iii) extracts the GPS time stamps embedded in the incoming signal data stream and subtracts them from the locally generated atomic clock or GPS time ticks, (iv) optionally keeps tunable laser 608 that serves as a local oscillator being phase-locked to the incoming signal at 624.

Lasers 606 and 608, from FIG. 11, at both ends of the communication link are locked to the same atomic line within 1 MHz. A 1 MHz Doppler shift corresponds to a velocity of 0.5 meter per second, which could be the base system resolution. The following algorithms, by way of illustration and without limitation, can be used to calculate the velocity and acceleration.

In one algorithm, DSP 622 detects the frequency difference $\Delta f_{dop}$ (due to the Doppler shift) between the incoming signal 622 and the local laser radiation 626, which are locked to the same atomic line. As an example, Mach one relative velocity corresponds to $\Delta f_{dop}$=600 MHz. The optional DSP PLL 628 is activated in order to lock the local laser into incoming signal frequency shift so that the message data will be decoded properly.

In a second algorithm, transmitter 602, at one end of communication link 600, starts sending a predetermined BPSK sequence of zeros and ones, $b_1, b_2, b_3 \ldots$ DSP 622 knows and recognizes this sequence. DSP 480 detects the phase sequence using the 90-degrees optical hybrid 612, and the balanced detectors 614 and 616, and obtains the sequence of signals, $\phi_1, \phi_2, \phi_3, \phi_4, \ldots$ Taking the previous example where the maximum Doppler shift, corresponding to Mach 1 is about 600 MHz, and a code rate of 10 GBs at least 8 first bits have the original code shifted by some phase $\Delta\phi_0$, i.e $\phi_i = \Delta\phi_0 + b_i$. This is enough to recognize the beginning of the sequence and establish the value of $\Delta\phi_0$. The original code $b_1, b_2, b_3 \ldots$ is recovered. However, as time elapses there is a bit error when the accumulated phase shift between the incoming signal and local laser reaches 180 degrees (BPSK), resulting in the sequence:

$b_1, b_2, b_3 \ldots b_{k-1}$ {overscore (b)}$_k$ {overscore (b)}$_{k+1} \ldots$ {overscore (b)}$_{2k-1}, b_{2k}, b_{2k+1} \ldots$ The data bit error appears in k-th bit and disappears in the 2 k-th bit only to reappear again in the 3 k-th bit. The following can thus be written: $kTb_i \Delta f_{dop} = \frac{1}{2}$; and therefore, The Doppler shift is $\Delta f_{dop} = \frac{1}{2}kTb_i$. Having established the Doppler shift, the signal can then be received for a while in the BPSK format while automatically performing the correction for it, with the use of efficient phase error correction schemes such as TCM. By doing this forward error correction DSP 622 calculates the Doppler shift and determines exactly where the bit k is. DSP 622 calculates the acceleration by monitoring the change in the Doppler shift versus time.

Figure 12:
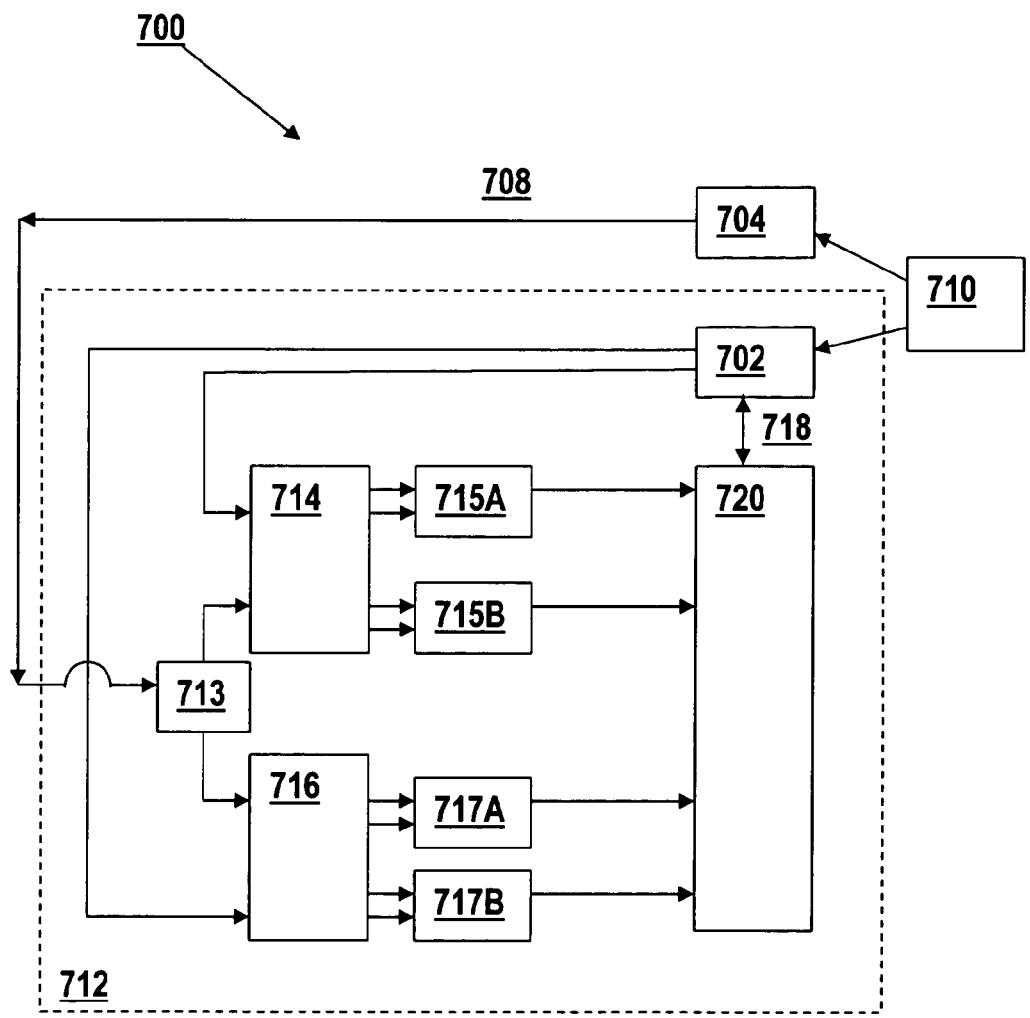
FIG. 12 illustrates an application of an embodiment of the present invention for maneuverability control.

In another embodiment, illustrated in FIG. 12, the Optical Device of the present invention is used for maneuverability control, generally denoted as 700. In this embodiment, the two lasers 702 and 704 at both ends of communication link 708 are locked to the same atomic line 710 and transmit polarized light. The receiver 712 employs a polarization diversity, phase diversity scheme. In this scheme the incoming signal is split by polarization beam splitter 712 into two beams with orthogonal polarization. Signals at two orthogonal polarizations are linearly transferred to the electrical baseband by two 90-degrees optical hybrids 714 and 716. The local oscillator, is in phase, and locked to the incoming signal, as described above in the velocity and acceleration calculation. The actual implementation of the PLL 718 is done in the digital part of receiver 720, and eliminates the need for a complex optical PLL. Because the transformation is linear, all of the filtering, for noise reduction and separation of carriers, can be performed in the electrical domain, with no reliance on narrow optical filters. Receiver 712, based on complex envelope data from two orthogonal polarizations, can track the rates of changes of the polarization and optimize correction matrix to recover the original polarization of the transmitted signal. After polarization is restored, by numerical methods, the data on each polarization can then be demodulated. Therefore, the homodyne coherent receiver, in conjunction with DSP 720 enables the implementation of a digital polarization diversity receiver 712 without reliance on optical components.

In one embodiment, DSP 720 detects and corrects the polarization difference Ap, due to the source maneuverability, between the incoming signal and the local laser. The polarization difference is an indicator source maneuverability since it is proportional to it.

In another embodiment, lasers 702 and 704, in FIG. 12, are at the both ends of communication link 700 are locked to the same atomic line source 710, may be provided by GPS, within a predetermined frequency deviation. Timing signals generated by atomic source 710 or GPS are embedded in a predetermined format in the data stream flowing between the source and the coherent homodyne receiver 712. DSP 720 recovers the incoming data and compares the decoded timing signals to the internally generated timing signals. Because the incoming signal processing time delay, the outgoing processing time delay and the speed of light in the link medium are known, DSP 720 calculates the time difference between the source and the receiver time ticks, and establishes a range finding system.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. An optical device for receiving and demodulating of a pulsed incoming optical signal transmitted through an optical link, comprising:
   a 90-degrees optical hybrid having a first and a second inputs, a first, a second, a third and a fourth outputs, receiving the pulsed incoming optical signal with a pulse rate P;
   a pulsed local oscillator having the same pulse rate P with a duration of each optical pulse equal to $T_1$, the pulsed local oscillator connected to the 90-degrees optical hybrid via the second input,
   four balanced photodetectors, connected to the first, the second, the third and the fourth outputs of the 90-degrees optical hybrid, the balanced photodetectors having electrical outputs,
   a digital signal processing (DSP) unit connected to the electrical outputs of the balanced photodetectors, the DSP unit recovering data from the incoming optical signal,
   wherein the 90-degrees optical hybrid is adapted to mix a pulse of the local oscillator with the duration $T_1$ with an incoming optical pulse with a duration $T_2$, entering the 90-degrees optical hybrid via the first input, where $T_2$ is greater than $T_1$ and thus performing time-domain filtering of the incoming optical signal; and wherein the pulse duration $T_1$ is within an area of minimal overlapping of adjacent pulses of the incoming optical signal.

2. The optical device of claim 1, wherein the optical device is a free-space optical link device.

3. The optical device of claim 1, wherein the optical device is a fiber communications optical link device.

4. The optical device of claim 1, wherein the optical device is a satellite communications optical link device.

5. The optical device of claim 1, wherein the optical device is used for optical sampling of the incoming signal pulse by the local oscillator optical pulses.

6. The optical device of claim 1, wherein the 90-degrees optical hybrid is formed as part of a single planar chip made of electro-optical material.

7. The optical device of claim 1, wherein the duration of the pulse $T_1$ is selected small enough to mitigate inter symbol interference in the incoming optical signal by using a narrow local oscillator pulse to select a part of the signal pulse, which is least corrupted by the adjacent signal pulses overlapping.

8. The optical device of claim 1, wherein the duration of the pulse $T_1$ is selected small enough to suppress signal-spontaneous beat noise of the incoming optical signal by using a narrow local oscillator pulse to select a part of the signal pulse, which is least corrupted by the adjacent signal pulses overlapping.

9. A method of receiving an incoming pulsed optical signal, comprising:

performing time-domain filtering of the incoming pulsed optical signal by mixing a pulse with a duration $T_2$ from the incoming optical signal with a pulse rate P with a pulse having a duration $T_1$ from a pulsed local oscillator signal with the same pulse rate P, where $T_2$ is greater than $T_1$, recovering data encoded in the incoming signal in a digital signal processing unit; and wherein the pulse duration $T_1$ is within an area of minimal overlapping of adjacent pulses of the incoming optical signal.

10. The method of claim 9, wherein the time-domain filtering is performed in 90-degrees optical hybrid.

11. The method of claim 9, wherein the data encoded in the incoming signal is quadrature phase shift keying modulated data.

12. An optical communication system for optical signal transmission, comprising:

a transmitter of a quadrature modulated optical signal; and a receiver, the receiver having a 90-degrees optical hybrid with a first and a second inputs, a first, a second, a third and a fourth outputs, the 90-degrees optical hybrid receiving the quadrature modulated optical signal with a pulse rate P via the first input, a pulsed local oscillator with the same pulse rate P with a duration of each pulse equal to $T_1$, the pulsed local oscillator connected to the 90-degrees optical hybrid via the second input, four balanced photodetectors, connected to the first, the second, the third and the fourth outputs of the 90-degrees optical hybrid, the balanced photodetectors having electrical outputs, a digital signal processing (DSP) unit connected to the electrical outputs of the balanced photodetectors, the DSP unit recovering data from the incoming optical signal, wherein the 90-degrees optical hybrid is adapted to mix a pulse of the local oscillator with the duration $T_1$ with an incoming optical pulse having a pulse duration $T_2$, where $T_2$ is greater than $T_1$ thus performing temporal filtering of the incoming optical signal to improve system performance; and wherein the pulse duration $T_1$ is within an area of minimal overlapping of adjacent pulses of the incoming optical signal.

13. The system of claim 12, wherein the system performance is improved by reduced saturation effect of the photodetectors due to the use of the pulsed local oscillator signal.

14. The system of claim 12, wherein the system performance is improved by reducing an amplified spontaneous emission noise in incoming optical signal due to the use of the pulsed local oscillator signal.

15. The system of claim 12, wherein the system performance is improved by reduction of the incoming signal degradation caused by inter-symbol interference by using a narrow local oscillator pulse to select a part of the signal pulse, which is least corrupted by the adjacent signal pulses overlapping.

16. The system of claim 12, wherein the system performance is improved by compensating of communications errors caused by angular misalignment of the transmitter and receiver in free space optical communications due to the use of the pulsed local oscillator signal.

17. The system of claim 12, wherein the system performance is improved by reducing inter symbol interference caused by fiber dispersion in fiber communications due to the use of the pulsed local oscillator signal.

18. The system of claim 12, wherein the transmitter comprises: a first Mach-Zehnder modulator that produces a first output; a second Mach-Zehnder modulator that produces a second output; a splitter coupled to the first and second Mach-Zehnder modulators; a combiner that combines the first and second outputs; and a phase shifter coupled to the first and second Mach-Zehnder modulators, wherein the first Mach-Zehnder modulator, the second Mach-Zehnder modulator, the splitter, the combiner and the phase shifter are formed as part of a single planar chip made of electro-optical material.

19. The system of claim 12, wherein the quadrature modulated optical signal has a wavelength of between about 1500 nanometers and about 1625 nanometers.

20. The system of claim 12, wherein the quadrature modulated optical signal has a linear polarization.

* * * * *